United States Patent [19]

Beakley et al.

[11] Patent Number: 5,363,664
[45] Date of Patent: * Nov. 15, 1994

[54] SINGLE AND MULTISTAGE REFRIGERATION SYSTEM AND METHOD USING HYDROCARBONS

[75] Inventors: George Beakley, Tempe, Ariz.; Craig Hosterman, Corvallis, Oreg.; Warren Rice, Tempe, Ariz.

[73] Assignee: HRB, L.L.C., Tempe, Ariz.

[ * ] Notice: The portion of the term of this patent subsequent to Oct. 15, 2008 has been disclaimed.

[21] Appl. No.: 994,885

[22] Filed: Dec. 22, 1992

Related U.S. Application Data

[63] Continuation-in-part of Ser. No. 543,976, Jun. 26, 1990, Pat. No. 5,056,323.

[51] Int. Cl.⁵ .......................... F04B 23/04; F25B 41/00
[52] U.S. Cl. .......................................... 62/113; 417/77
[58] Field of Search ................... 417/77, 65; 62/115, 62/113, 498, 500, 510

[56] References Cited

U.S. PATENT DOCUMENTS

| 4,157,015 | 6/1979 | Hosterman et al. | 62/115 |
| 4,251,998 | 2/1981 | Hosterman et al. | 62/115 |
| 4,424,681 | 1/1984 | Rice et al. | 62/114 |
| 5,056,323 | 10/1991 | Rice et al. | 62/114 |

Primary Examiner—William E. Wayner
Attorney, Agent, or Firm—Cahill, Sutton & Thomas

[57] ABSTRACT

A hydraulic refrigeration system (10) employs as a preferred embodiment a hydrocarbon fluid as a refrigerant in combination with a non-miscible carrier fluid. A plurality of stages (110, 210, 310) of hydraulic refrigeration system (10) may be used by conveying the segregated refrigerant vapor from each stage to the entrainer (240, 340) of the next succeeding stage (210, 310). The liquid refrigerant of the last stage (310) is conveyed to an evaporator (416), which may be remotely located. The outflow of the evaporator (416) is conveyed to the entrainer (140) of the first stage (110). Second and succeeding stages include a non-miscible carrier fluid return line (268) connected to the respective separators (214, 314) for returning the non-miscible carrier fluid to the separator (114) of the first stage (110).

31 Claims, 2 Drawing Sheets

SINGLE AND MULTISTAGE REFRIGERATION SYSTEM AND METHOD USING HYDROCARBONS

This application is a continuation of copending application filed under the Patent Cooperation Treaty entitled "SINGLE AND MULTISTAGE REFRIGERATION SYSTEM AND METHOD USING HYDROCARBONS", filed Jun. 12, 1991, Ser. No. PCT/US91/04172 describing an invention by the present inventors and which is a continuation in part of Ser. No. 543,976, filed Jun. 26, 1990, now U.S. Pat. No. 5,056,323 and describing an invention by the present inventors.

BACKGROUND OF THE INVENTION

1. Field of the Invention

The present invention relates to refrigeration systems and, more particularly, to hydraulic refrigeration systems employing a hydrocarbon as a refrigerant.

2. Description of the Prior Art

The principle of entrapping and compressing air by movement of water, i.e., using a hydraulic air compressor or "trompe" has been employed industrially in various parts of the world for some years. In one such installation, air is drawn into a down flowing stream of water and trapped within a cavernous underground chamber where the head of water maintains it under compression. The air may be permitted to escape through a pneumatic engine or turbine; thus, power may be generated.

In refrigeration systems, the major operating costs arise from the costs attendant energizing a mechanical compressor to compress adiabatically the refrigerant. Additionally, the cost of such a compressor is a substantial part of the initial cost of the refrigeration system itself. Thus, it would be beneficial from the standpoint of both initial and operating costs to eliminate the need for a mechanical compressor in a refrigeration system.

The use of CFC refrigerants, sometimes referred to by the trademark "FREON", is in the process of being legislated and taxed out of existence. These compounds, when leaked or dumped to the atmosphere, are thought to migrate to the stratosphere where destruction of the ozone layer is believed to occur. This layer is the earth's protection against the part of the radiation from the sun known as UV-B. An increase in UV-B radiation reaching the surface of the earth will cause increased incidence of skin and other cancer in humans and, if severe enough, interference with plant life and interruption of the earth's food chain.

An alternative family of compounds known as HCFC's are thought to cause much less ozone damage than do the CFC compounds but this is not certain; legislation is already underway against use of HCFC compounds. Nevertheless, the refrigeration industry is presently proceeding with new designs and manufacturing methods to produce refrigeration systems using HCFC compounds. This direction would appear to be an interim solution and not a permanent or desirable solution to the well recognized problem. Furthermore, conventional refrigeration systems using HCFC compounds are larger and less efficient than systems in current use with CFC compounds.

An additional alternative family of compounds known as HFC's are thought to do little or no damage to the ozone layer. The use of these compounds is still in the preliminary stages of experimentation and production. If these compounds prove feasible, they will require new system designs and manufacturing techniques. It is anticipated that these systems will be expensive and inefficient. Other conventional systems of refrigeration include absorption systems and systems using anhydrous ammonia as the refrigerant. For various reasons, these systems also are not suitable replacements for conventional systems using CFC compounds.

Some members of the hydrocarbon family are known to be excellent refrigerants except that they are flammable. It is not safe or feasible to use hydrocarbon refrigerants in conventional vapor compression refrigeration machines. Any leak would expel a pure flammable gas. In the piping or conduits following the compressor, the refrigerant is at a temperature of several hundred degrees Fahrenheit and ignition of any leaking refrigerant would probably occur immediately upon leakage. Because of the relatively high pressures, intense vibration and pressure oscillations attendant conventional systems, some leakage within the system is likely.

SUMMARY OF THE INVENTION

The present invention is directed to a refrigeration system which employs the principles of operation of a trompe system (system where a gas in the form of bubbles is urged downward by a liquid state. The present invention is capable of utilizing any refrigerant that vaporizes when absorbing heat and condenses under the influence of heat removal and pressure. A further requirement for the refrigerant is that the liquid carrier and the refrigerant not be mutually miscible with one another. There are many combinations of refrigerant and liquid carriers possible and although this present invention will describe the use of hydrocarbon refrigerants and water as the liquid carrier, its use with other combinations is well recognized by those schooled in the arts.

To provide the requisite pressure head to the liquid carrier to effect compression of the refrigerant fluid, a pump for pumping the liquid carrier through a closed loop is employed. After separation of the liquid refrigerant from the liquid carrier, the refrigerant fluid is pumped to an evaporator through an expansion valve. The liquid carrier is pumped upwardly through a cross flow heat exchanger. A variable volume tank is coupled to the upflowing liquid carrier to permit an increase or decrease in volume of the liquid carrier. The outflow of the gaseous refrigerant from the evaporator flows through a regenerator coupled with the refrigerant conduit leading to the expansion valve and to an entraining unit. The gaseous refrigerant is entrained within the down flowing liquid carrier to repeat the cycle. The highest temperature in the system is only in the range of 29° C. (85° F.) to 43° C. (110° F.) which is well below the ignition point of the hydrocarbon refrigerant. The large piping employed during compression results in an approximate 100/1 mixing with the liquid carrier, which mixture is not flammable. The flow of refrigerant from the separator to the entraining unit is through a relatively small diameter pipe or conduit, which size of pipe is easy to make virtually leak proof. Moreover, the pressures within the pipe are low to moderate and a safety hazard is not presented. Multiple stages of the above described single stage may be employed. In the operation of the multi stage system, the compressed refrigerant gas of one stage is introduced to the entraining unit or sparger of the succeeding or downstream stage. The condensed refrigerant fluid of the last stage is conveyed to the evaporator through the expansion valve and the outflow from the evaporator is conveyed to the entraining unit of the first or upstream most stage. To compensate for the slow, excess accumulation of liquid carrier in the downstream stages due to an inevitable but small quantity of liquid carrier vapor carried by the refrigerant vapor, a liquid carrier level sensor is disposed in each downstream separator to open a valve and permit liquid carrier to flow to the upstream stage in response to the high pressures attendant the downstream separators.

It is therefore a primary object of the present invention to provide a refrigeration system for using a hydrocarbon refrigerant.

Yet another object of the present invention is to provide a refrigerant for use in a refrigeration system which will not cause damage to the ozone layer in the event of leakage and escape of refrigerant.

Still another object of the present invention is to provide a refrigeration system which will permit control of parameters necessary to optimize operation during varying load conditions.

A further object of the present invention is to provide a multistage refrigeration system safe for use with a hydrocarbon as the refrigerant.

A yet further object of the present invention is to provide apparatus for removing liquid carrier accumulating in succeeding stages of a multistage hydraulic refrigeration system.

A yet further object of the present invention is to provide a multistage hydraulic refrigeration system having a remotely locatable evaporator.

A still further object of the present invention is to provide a method for using a hydrocarbon in a refrigeration system.

A still further object of the present invention is to provide a method for providing refrigeration with a multistage hydraulic refrigeration system.

These and other objects of the present invention will become apparent to those skilled in the art as the description thereof proceeds.

BRIEF DESCRIPTION OF THE DRAWINGS

The present invention will be described with greater clarity and specificity with reference the following drawing, in which.

DESCRIPTION OF THE PREFERRED EMBODIMENT

Conventional refrigeration systems involve temperatures of several hundred degrees Centigrade, well above the ignition temperature of gaseous hydrocarbons. Any leaking hydrocarbon at these temperatures would probably ignite immediately. Conventional refrigeration systems are prone to some leakage because the condenser operates at relatively high pressures. Moreover, the intense vibration and pressure oscillations experienced by components in conventional refrigeration systems contribute to or may induce leakage. Because of the safety hazard potential resulting from an expectation of ignition of a hydrocarbon refrigerant upon leakage, such a hydrocarbon refrigerant is undesirable for use with a conventional refrigeration system.

Figure 1:
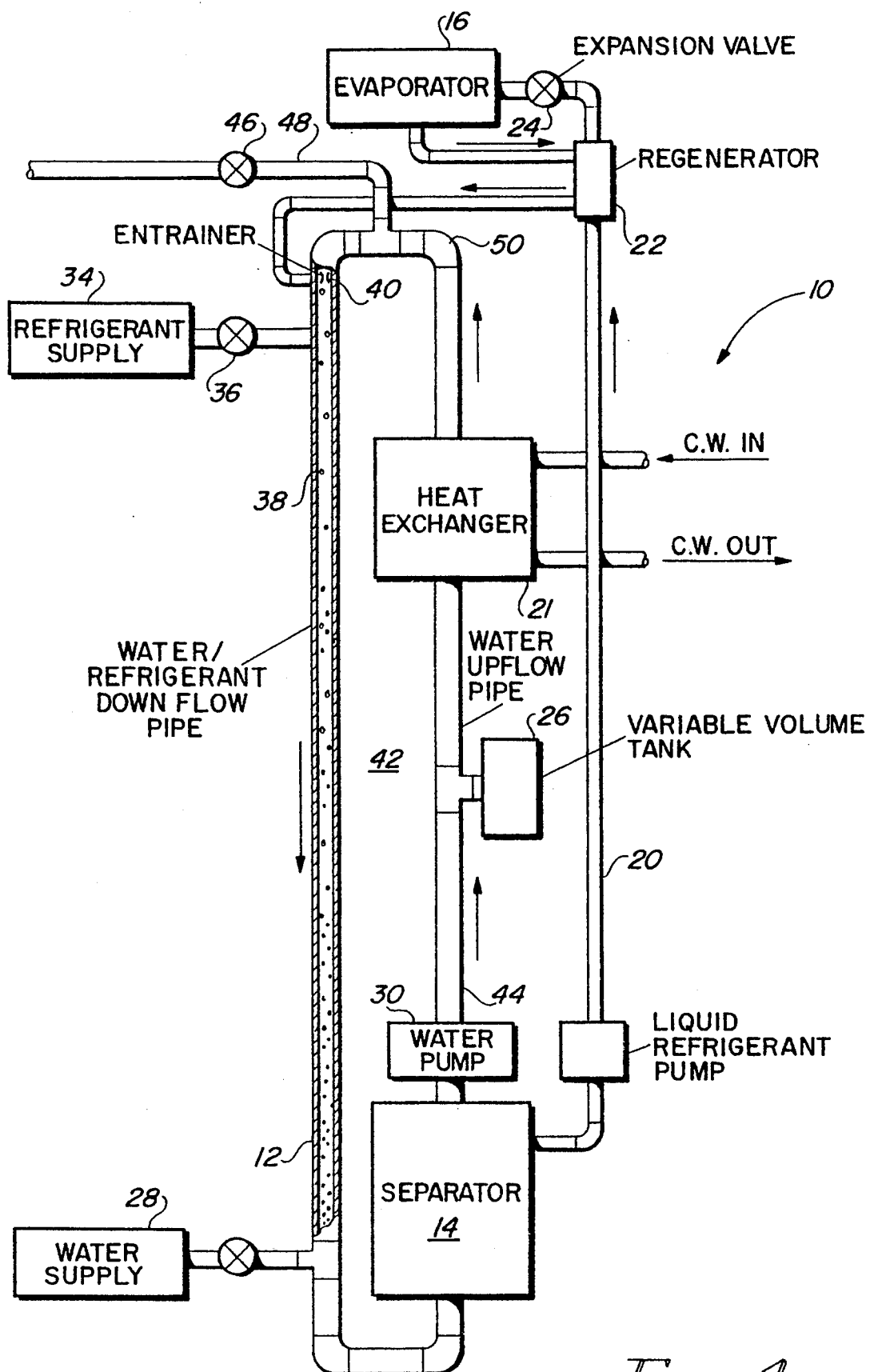
FIG. 1 illustrates a block diagram specific for the components for the hydrocarbon refrigeration system.

A hydraulic refrigeration system 10, as illustrated in FIG. 1, can use a hydrocarbon refrigerant with essentially complete safety. The highest temperature in the hydraulic refrigeration system is only in the range of (29°–43° C.) (85°–110° F.), which temperature range is far below the ignition point of a hydrocarbon refrigerant. In the large diameter down flow pipe 12 of the hydraulic refrigeration system, the refrigerant is mixed with more than 100 times its own weight of the liquid carrier, such as water. Thus, any leaked refrigerant would not be flammable. Between separator 14 and evaporator 16 and from the evaporator to the entrainment means 40, the hydrocarbon refrigerant is not mixed with liquid carrier (water). However, pipes 18 and 20 used in this section are of relatively small diameter and easy to make virtually leak proof. Furthermore, evaporator 16 is a passive component and unlikely to leak at its normal low to moderate pressure. From a practical standpoint, a hydrocarbon refrigerant in a hydraulic refrigeration system would appear not to pose a safety hazard.

Among the available hydrocarbon refrigerants, n-butane, isobutane and propane appear to be the most likely and practical refrigerants; they are not miscible with a liquid carrier, such as water. Temperature and pressure combinations at which clathrates form must be avoided in most applications. For air conditioning purposes, n-butane is thought to be the best choice. At the evaporator temperatures of interest in an air conditioning system, the pressure is only slightly greater than atmospheric pressure. N-butane has a large latent heat of condensation and has a reasonably large density when in the vapor state. These are desirable properties for a refrigerant. However, isobutane and propane, and possibly other hydrocarbons, may be preferred in particular refrigeration applications of a hydraulic refrigeration system.

A hydraulic refrigeration system can be used as a heat pump in the same general manner as can any vapor compression refrigeration system. In such system, the evaporator temperature is made less than that of an available environmental heat source to transfer heat from the heat source to the refrigerant as the refrigerant passes through the evaporator. Ultimately, the heat is manifested as thermal energy in the hydraulic refrigeration system circulating liquid carrier. The liquid carrier, or water, is maintained at a temperature greater than that of the fluid or object to be heated and heat is continuously removed from the hydraulic refrigeration system by such fluid or object through heat exchanger 21. Just as in the case with a conventional vapor compression heat pump, the hydraulic refrigeration system supplies as heat both the energy entering the refrigerant at the evaporator and the energy supplied to the liquid carrier (water) and refrigerant by the pumps. Therefore, the "energy efficiency ratio" (EER) is larger when the hydraulic refrigeration system is used as a heat pump than it is when the hydraulic refrigeration system is used as a refrigerator.

A regenerator 22 can be added to the basic hydraulic refrigeration system, which regenerator will result in an increase in the EER; that is, the system becomes more energy conservative. The regenerator is a refrigerant to refrigerant heat exchanger. The liquid refrigerant flowing toward expansion valve 24, at a nominal temperature of 38° C. (100° F.), exchanges heat in counterflow with the vaporous refrigerant leaving the evaporator at a nominal temperature of 10° C. (50° F.). As a result, the liquid refrigerant is cooled and the vapor is heated with attendant thermodynamic benefits to the efficiency of the system.

The most obvious location for evaporator 16 is at or near the top of hydraulic refrigeration system 10 but it can be located anywhere, including the bottom of the system. This feature of a remote evaporator is easily achievable by using a hydraulic refrigeration system and which feature is difficult to achieve with conventional refrigeration systems. For example, it can be at the air register in a building, which location would allow reduction in the amount of large air ducting common in conventional air conditioning systems. Alternatively, several small evaporators may be used at remote and different locations instead of a single larger evaporator. This is feasible because there is no strict requirement for the refrigerant vapor to return to the compressor conduit at a certain thermodynamic or physical state. It is well known that a conventional compressor cannot tolerate any liquid refrigerant and the performance of a conventional system is compromised by excessive superheating. Thus, the returning refrigerant in the hydraulic refrigeration system could contain some liquid or be highly superheated without resulting in problems of operation.

In air conditioning applications particularly, the refrigeration load varies continuously both daily and seasonally. For most efficient energy utilization, a refrigeration system should employ a modulating control system to permit the system to run all the time during the season and slowly change one or more of the operating parameters to maintain the system near its maximum possible efficiency under all refrigeration loads. These parameters may include compressor speed, fan speed, etc. While such modulation is featured in some conventional systems, it is difficult, complicated and expensive to accomplish primarily because conventional systems use only a single fluid and have a fixed volume in which it is contained. Thus, most presently used conventional systems are either on or off and achieve only an average matching of refrigeration to meet varying refrigeration loads. This results in conventional systems operating most of the time at an "off-design point" condition which is a part load or overload condition with a substantial reduction in efficiency from that possible by using a modulating control.

The present hydraulic refrigeration system can achieve load matching modulation easily and simply with substantial flexibility. This is possible because there are two fluids, the carrier fluid and the refrigerant fluid. Each of these can be separately controlled with regard to flow rates, temperatures, etc. Provision can easily be made to vary the total volume of the pipes, conduits and tanks in which the fluids are contained. With respect to the carrier fluid, the addition of a variable volume tank 26 permits accepting the carrier fluid (water) from the main conduit pipe 12 of the hydraulic refrigeration system or from a water supply 28.

The temperature in evaporator 16 can be held at a desired value. To increase the evaporator temperature, carrier fluid (water) can be added from variable volume tank 26 which would result in an increase in pressure in the evaporator, as well as throughout hydraulic refrigeration system 10 since the refrigerant in the evaporator is a two phase mixture. By removing carrier fluid (water) from the hydraulic refrigeration system to the variable volume tank, the evaporator pressure and temperature will be reduced. An automatic control loop could be employed to vary the volume of the carrier fluid (water) in the variable volume tank in response to a control error signal from a temperature sensor in the evaporator.

A change in refrigeration load could be compensated by the variable volume tank as described above. In order to operate at a new load with good efficiency, the carrier fluid (water) flow rate and/or the refrigerant flow rate should be set to new values to yield the best energy efficiency at the new load. Using n-butane as the refrigerant, performance curves based upon flow rates can be readily determined by analytical modeling techniques. Accordingly, flow rate sensors and refrigeration rate sensors could be used to provide input information to a control system element, which element would contain an algorithm for the approximate performance characteristics of the hydraulic refrigeration system. The control system element would also provide an output to cause or result in adjustment of the speed of carrier fluid (water) pump 30 and liquid refrigerant pump 32 to maintain operation near the possible maximum efficiency.

Based upon theoretical deduction and proven by direct experimentation, the fluids in a hydraulic refrigeration system must be very well deaerated. If not, the necessary condensation of the refrigerant will not occur in a satisfactory manner. While any of the several well known means of deaeration could be used, the following method is preferred because it is performed easily, quickly and cheaply. The hydraulic refrigeration system is initially filled with carrier fluid (distilled water) with variable volume tank 26 being at its smallest volume. The carrier fluid (water) is caused to circulate slowly by carrier fluid (water) pump 30. Refrigerant from a refrigerant supply 34 is continuously injected into the refrigerant loop through a fill valve 36. Upon injection, it forms bubbles in the carrier fluid (water) in addition to bubbles 38 formed upon entrainment of the refrigerant through entrainer 40. The air that is in solution in the carrier fluid (water) diffuses into bubbles 38 of the refrigerant as they repeatedly travel around carrier fluid (water) loop 42, down pipe 12 and up pipe 44. The refrigerant is allowed to escape from the hydraulic refrigeration system to the atmosphere from a valve 46 connected by a conduit 48 at the highest location on carrier fluid (water) loop 42, such as introducing pipe 50 for introducing the upflowing carrier fluid (water) to the downflowing carrier fluid (water). The escape rate is at approximately the same flow rate as that of the refrigerant being supplied. This process is continued for several hours until the fluids in the system are sufficiently deaerated. Refrigerant escape valve 46 is closed and additional refrigerant is added to the desired charging amount. This may be referred to as a purging method of deaeration.

Various types of separators 14 may be used in a hydraulic refrigeration system. Preferably, the separator should be physically small and cause only a small pressure drop in the fluid. It should be passive (without rotating shafts) and achieve excellent separation of the liquid refrigerant from the liquid carrier. These characteristics are mutually exclusive and the choice of the separator and its design details will necessarily result in certain compromises. A conventional but specially designed separator would be a reasonable choice. A separator of this type has been analytically modeled. It will gravitationally separate by using myriad fixed circular disks within a circular housing. Laminar flow of the mixture radially between the disks allow the droplets of refrigerant to separate from the liquid carrier and form a film on the disks. The film is collected as a liquid refrigerant stream leaving the separator. Calculations indicate excellent separation with very small pressure drop; however, such type of separator would be relatively large.

Hydraulic refrigeration system 10 may be used to provide refrigeration below the freezing temperature of the carrier fluid and if it is water, by achieving good separation and/or using an antifreeze fluid in the water. Alternatively, evaporator 16 may include a flexible structure to permit minor amounts of ice that may be formed on the surface to be flexed off and removed. If a desired product is ice for cooling or storing, rather than for consumption in food or drink, "frazzle ice" can be formed by operating the evaporator at a temperature lower than the freezing temperature of the water and deliberately spraying water in the evaporator. The resulting ice would be much like snow or sleet and would be contaminated by the hydrocarbon refrigerant. However, there may be a wide commercial use of such an icemaking machine. The refrigerant and the water could be recovered after use and reinjected into the hydraulic refrigeration system.

Figure 2:
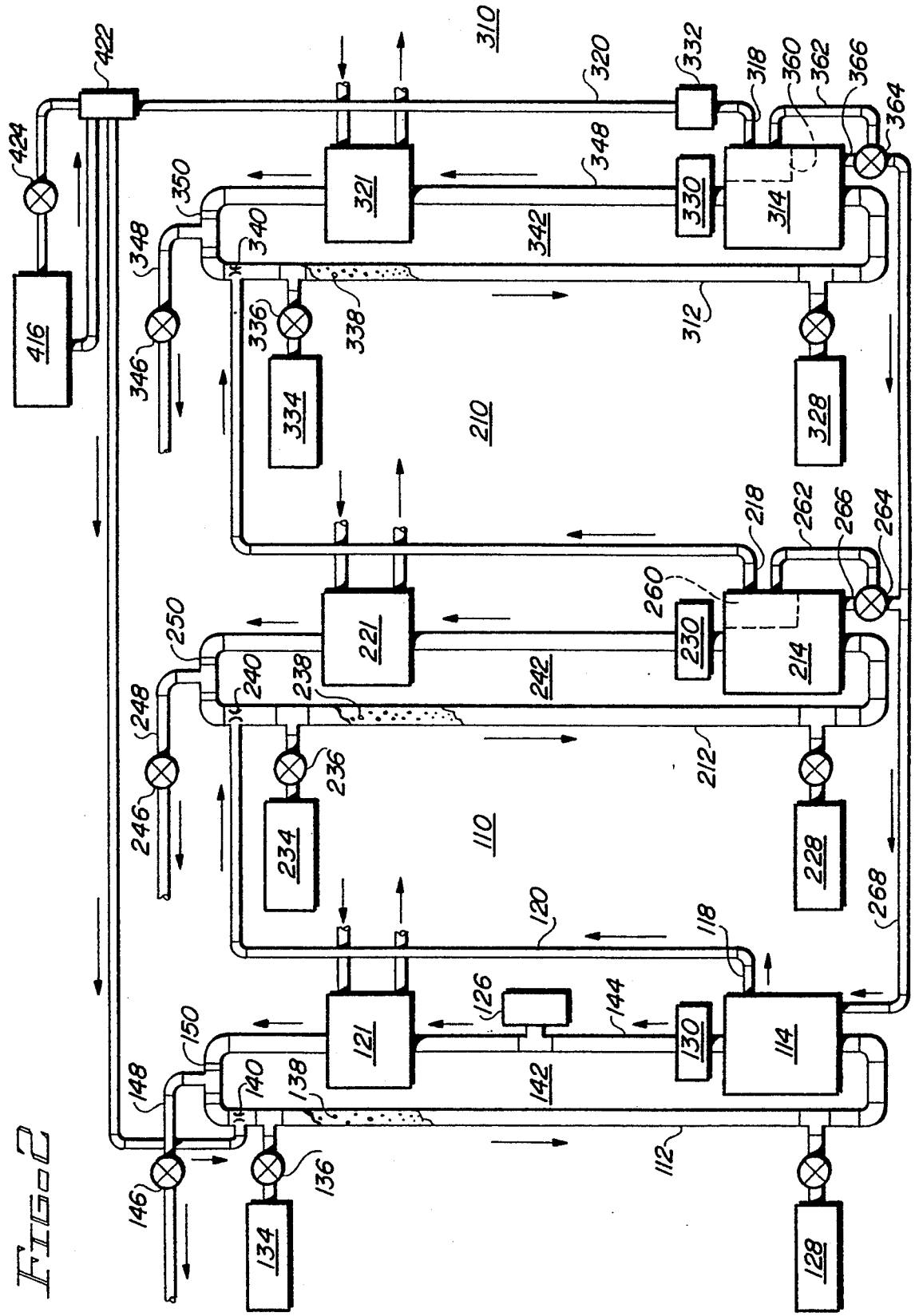
FIG. 2 illustrates a block diagram specific for the components for a multistage hydrocarbon refrigeration system.

It is possible to employ plurality of stages of hydraulic refrigeration system 10, as shown in FIG. 2. Herein, three stages of the hydraulic refrigeration system are depicted and identified by reference numerals 110, 210 and 310. For simplicity of reference and uniformity, the reference numerals used in conjunction with hydraulic refrigeration system 10 will be used for each of stages 110, 210 and 310 except for the addition of a prefix numeral of 1, 2 or 3 and depicting the respective stage.

With respect to each stage, the operation will be essentially duplicative of that described above with respect to hydraulic refrigeration system 10. For this reason, only the modifications necessary for multistaging and for incorporating a liquid carrier (water) purging system will be described hereafter.

Pipe 120, from separator 114 of stage 110, will convey vaporous refrigerant to entrainer 240 of stage 210. Pipe 220 will convey vaporous refrigerant from separator 214 of stage 210 to entrainer 340 of stage 310. The refrigerant conveyed through pipe 320 from liquid refrigerant pump 332 of stage 310 passes through regenerator 422, expansion valve 424 and into evaporator 416. The outflow of the evaporator is conveyed through regenerator 422 to entrainer 140 of stage 110. From the above description, it will be apparent that the pressures attendant stage 210 will be greater than those of stage 110. Likewise, the pressures attendant stage 310 will be greater than those attendant 210.

Because water is a preferred liquid carrier, it is inevitable that a small quantity of water vapor will mix and flow with the refrigerant vapor. This will result in a slow depletion of the amount of water in stage 110 with a commensurate slow increase in the amount of water in stages 2 and 3. Eventually, the hydraulic refrigeration system would become inoperable.

A water level sensor 260 may be disposed within (as illustrated by dashed lines) or associated with separator 214 in stage 210. Such sensor would detect the presence of water above a predetermined level. In response to such detection, an electrical signal may be generated. The electrical signal is conveyed through conductor 262 to a solenoid valve 264 to actuate such valve during the presence of a signal. Valve 264 is disposed in a water line 266 associated with separator 214 to convey water collected therein to water return line 268 via valve 264. The outflow of the return water line flows into separator 114 of stage 110. Similarly, water level sensor 360 is disposed in separator 314 of stage 310. This sensor senses the water level present within the separator. When the water level exceeds a predetermined level, a signal is generated and conveyed through conductor 362 to solenoid valve 364. Water line 366 conveys water from separator 314 via valve 364 to return line 268. The flow through the return line will be to the upstream stage since the pressure attendant the separator is higher in each succeeding downstream separator. It is to be understood that the duration of valves 264 and 364 are open may be predetermined and initiated by an electrical signal in conductors 262, 362, respectively; or, the valves may be open only for the duration a signal is present on the respective conductor(s).

With the above water sensing and water conveying apparatus, water introduced to stages 210 and 310 calm be readily purged by returning the water to stage 110. The water line and return line through which the water flows to stage 110 may be small. For example, copper tubing $\frac{1}{4}$ inch in diameter would be adequate on a hydraulic refrigeration system as large as ten tons. On such a large hydraulic refrigeration system, the water flow rate to stage 110, from stages 210, 310, is approximately a total of 2 gallons per hour.

We claim:

1. Apparatus for converting a gaseous refrigerant fluid expelled from an evaporator in a refrigeration system into a liquid refrigerant fluid introduced to an expansion valve of the refrigeration system by entraining the refrigerant fluid with a carrier non-miscible with refrigerant fluid, said apparatus comprising in combination:
   a) means for entraining the gaseous refrigerant fluid with the carrier;
   b) means for conveying the carrier and the entrained refrigerant fluid downwardly and increasing the pressure thereof to convert the entrained gaseous refrigerant fluid into entrained mostly liquid refrigerant fluid;
   c) means for segregating the downwardly conveyed carrier and entrained refrigerant fluid;
   d) means for withdrawing the carrier from said segregating means;
   e) means for conveying the carrier upwardly from said segregating means to said downwardly conveying means to form a loop for the carrier;
   f) means in fluid communication with said upwardly conveying means for accommodating for differences in load placed upon the refrigeration system by varying the volume of the carrier within the loop; and
   g) further means for conveying the refrigerant fluid from said segregating means to the expansion valve and to the evaporator.

2. The apparatus as set forth in claim 1 wherein the refrigerant fluid is a hydrocarbon fluid.

3. The apparatus as set forth in claim 1 wherein said accommodating means includes a variable volume tank connected in fluid communication with said upwardly conveying means.

4. The apparatus as set forth in claim 1 wherein said withdrawing means includes means for pumping the carrier through said upwardly conveying means to said entraining means.

5. The apparatus as set forth in claim 1 wherein the carrier is water.

6. The apparatus as set forth in claim 5 wherein the refrigerant fluid is a hydrocarbon fluid.

7. The apparatus as set forth in claim 1 including means for drawing heat from the withdrawn carrier.

8. A method for converting a gaseous refrigerant fluid expelled from an evaporator in a refrigeration system into a liquid refrigerant fluid introduced to an expansion valve of the refrigeration system by entraining the refrigerant fluid with a carrier fluid non-miscible with the refrigerant fluid, said method comprising the steps of:
   a) entraining the gaseous refrigerant fluid with the carrier fluid;
   b) conveying the carrier fluid and the entrained refrigerant fluid downwardly through a down pipe to increase the pressure thereof in proportion to the depth of the down pipe until the entrained gaseous refrigerant fluid is converted into entrained mostly liquid refrigerant fluid;
   c) segregating the carrier fluid from the liquid refrigerant fluid;
   d) withdrawing the segregated carrier fluid and returning the carrier fluid to the down pipe;
   e) accommodating for differences in load placed upon the refrigeration system by varying the volume of the segregated carrier fluid; and
   f) conveying the segregated liquid refrigerant fluid to the expansion valve.

9. The method as set forth in claim 8 wherein the refrigerant fluid is a hydrocarbon fluid.

10. The method as set forth in claim 8 wherein the carrier fluid is water.

11. Apparatus for compressing and withdrawing heat from a refrigerant fluid within a refrigeration system having an evaporator and an expansion valve, said apparatus comprising in combination:
   a) a refrigerant fluid comprising a hydrocarbon fluid;
   b) means for establishing a downward flow of a fluid non-miscible with the hydrocarbon fluid within a down pipe;
   c) means for conveying the hydrocarbon fluid from the evaporator to the upper end of the down pipe;
   d) means for entraining the hydrocarbon fluid within the downward flow of the non-miscible fluid;
   e) means for separating the hydrocarbon fluid from the non-miscible fluid at the lower end of the down pipe;
   f) means for drawing heat from the separated non-miscible fluid with a heat exchanger; and
   g) means for transmitting the Segregated hydrocarbon fluid from the lower end of the down pipe through the expansion valve and to the evaporator.

12. The apparatus as set forth in claim 11 wherein the non-miscible fluid is water.

13. A method for compressing and withdrawing heat from a refrigerant fluid within a refrigeration system having an evaporator and an expansion valve, said method comprising the steps of:
   a) using a refrigerant fluid which is a hydrocarbon fluid;
   b) establishing a downward flow of a fluid non-miscible with the hydrocarbon fluid within a down pipe;
   c) conveying the hydrocarbon fluid from the evaporator to the upper end of the down pipe;
   d) entraining the hydrocarbon fluid within the downward flow of the non-miscible fluid;
   e) separating the hydrocarbon fluid from the non-miscible fluid at the lower end of the down pipe;
   f) drawing heat from the separated non-miscible fluid with a heat exchanger; and
   g) transmitting the separated refrigerant fluid from the lower end of the down pipe through the expansion valve and to the evaporator.

14. The method as set forth in claim 13 wherein the non-miscible fluid is water.

15. Hydraulic refrigeration apparatus having a plurality of stages, said apparatus comprising in combination:
   a) each stage of said plurality of stages including:
      1) a vertically oriented loop having a lower end and an upper end for compressing a refrigerant fluid entrained in a carrier fluid non miscible with the refrigerant fluid in response to downward flow of the carrier fluid;
      2) means for segregating the refrigerant fluid from the carrier fluid at the lower end of said loop;
      3) said loop including means for conveying the carrier fluid from the lower end of said loop to the upper end of said loop;
      4) means for drawing heat from the carrier fluid during conveyance of the carrier fluid to the upper end of said loop;
      5) means for entraining the refrigerant fluid with the carrier fluid in the downward flow path of the carrier fluid within said loop;
   b) further means for conveying the segregated refrigerant fluid from said segregating means to said entraining means of the next downstream one of said stages;
   c) an evaporator and an expansion valve disposed upstream of said evaporator;
   d) yet further means for conveying the segregated refrigerant fluid from said segregating means of the downstream most one of said stages to said evaporator through said expansion valve; and
   e) still further means for conveying the refrigerant fluid from said evaporator to said entraining means of the upstream most one of said stages.

16. The apparatus as set forth in claim 15 including means for channeling any of the carrier fluid conveyed by the refrigerant fluid to a downstream one of said stages to an upstream one of said stages.

17. The apparatus as set forth in claim 16 wherein said channeling means includes a carrier fluid level sensing means disposed in said segregating means of at least one downstream one of said stages for sensing an increase in carrier fluid conveyed by the refrigerant fluid, a return line interconnecting said segregating means in the at least one downstream one of said stages with said segregating means of an upstream one of said stages, and valve means responsive to said carrier fluid level sensing means for controlling carrier fluid flow through said return line.

18. The apparatus as set forth in claim 17 wherein each one of said stages downstream of the upstream most one of said stages includes said level sensing means and said valve means and wherein said return line interconnects each of said valve means with said segregating means of the upstream most one of said stages.

19. The apparatus as set forth in claim 15 wherein said evaporator is located remote from said plurality of stages.

20. The apparatus as set forth in claim 15 wherein the refrigerant fluid is a hydrocarbon fluid and including means disposed in at least one of said stages for pumping the hydrocarbon refrigerant fluid from the respective one of said segregating means.

21. The apparatus as set forth in claim 15 wherein the carrier fluid is water.

22. The apparatus as set forth in claim 15 including means for varying the quantity of the carrier fluid within each of said loops as a function of varying refrigeration loads.

23. The apparatus as set forth in claim 15 including means for deaerating each of said loops.

24. A method for compressing and withdrawing heat from a refrigerant fluid within a multistage refrigeration system including an evaporator and an expansion valve, said method comprising the steps of:
 a) in each stage
  1) establishing a downward flow of a carrier fluid non-miscible with the refrigerant fluid within a down pipe of a loop;
  2) entraining the refrigerant fluid within the flow of the non-miscible carrier fluid;
  3) separating the refrigerant fluid from the non-miscible carrier fluid proximate the lower end of the down pipe;
  4) drawing heat from the non-miscible carrier fluid within an up pipe of the loop;
 b) conveying the segregated refrigerant fluid from an upstream stage for entrainment with the non-miscible carrier fluid in the next downstream stage;
 c) further conveying the segregated refrigerant fluid from the last downstream stage through the expansion valve to the evaporator; and
 d) yet further conveying the refrigerant fluid from the evaporator for entrainment with the non-miscible carrier fluid in the upstream most one of the stages.

25. The method as set forth in claim 24 including the step of purging the downstream stages of any non-miscible carrier fluid conveyed thereto from an upstream stage in the form of vapor by the refrigerant fluid.

26. The method as set forth in claim 24 including the step of pumping the segregated non-miscible carrier fluid within the loop of each stage.

27. The method as set forth in claim 24 including the step of pumping the segregated refrigerant fluid from the downstream most stage to the expansion valve.

28. The method as set forth in claim 24 including the step of deaerating each stage.

29. The method as set forth in claim 24 including the step of varying the quantity of non-miscible carrier fluid in each stage in response to varying refrigeration loads.

30. The method as set forth in claim 24 wherein the refrigerant fluid is a hydrocarbon fluid.

31. The method as set forth in claim 24 wherein the non-miscible carrier fluid is water.

* * * * *